(12) United States Patent
Balabanov et al.

(10) Patent No.: US 10,195,817 B2
(45) Date of Patent: Feb. 5, 2019

(54) SKIN-STRINGER DESIGN FOR COMPOSITE WINGS

(71) Applicant: The Boeing Company, Chicago, IL (US)

(72) Inventors: Vladimir Balabanov, Mukilteo, WA (US); Olaf Weckner, Seattle, WA (US); Yuan-Jye Wu, Issaquah, WA (US); Abdelhai Maysara Saadi, Snohomish, WA (US); Mostafa Rassaian, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 592 days.

(21) Appl. No.: 14/588,536

(22) Filed: Jan. 2, 2015

(65) Prior Publication Data

US 2016/0193806 A1    Jul. 7, 2016

(51) Int. Cl.
*B32B 5/12*    (2006.01)
*B32B 5/02*    (2006.01)
(Continued)

(52) U.S. Cl.
CPC ............. *B32B 5/12* (2013.01); *B32B 5/02* (2013.01); *G06F 17/18* (2013.01); *G06F 17/50* (2013.01);
(Continued)

(58) Field of Classification Search
CPC ......... B32B 5/12; B32B 5/02; B32B 2250/20; B32B 2307/544; B32B 2605/18;
(Continued)

(56) References Cited

U.S. PATENT DOCUMENTS 6,405,978 B1 *  6/2002  Dean ....................... B60R 19/18
                                                   244/117 R
8,444,087 B2 *  5/2013  Kismarton ............ B29C 65/562
                                                      244/119
(Continued)

FOREIGN PATENT DOCUMENTS

EP    2676787 A1    12/2013
EP    2764987 A1     8/2014

OTHER PUBLICATIONS

Extended European Search Report dated Jun. 15, 2016 in European Patent Application No. 15202206.7 (European counterpart of the instant U.S. patent application).
(Continued)

*Primary Examiner* — Frank J Vineis
*Assistant Examiner* — Donald M Flores, Jr.
(74) *Attorney, Agent, or Firm* — Ostrager Chong Flaherty & Broitman P.C.

(57) ABSTRACT

Composite skin-stringer structures which reduce or eliminate the risk of delamination at the skin-stringer interface. This can be accomplished by arranging ply directions (i.e., the angles of the fiber paths of the ply) in a layup in a way such that for the dominant loading, the skin and stringer will each deform in a way that reduces relative opening (fracture Mode I) and/or sliding (fracture Mode II) and/or scissoring (fracture Mode III) at the skin-stringer interface. This is possible when coupling between specific deformations modes is purposefully activated instead of being suppressed. The ply directions in the stringer are adjusted so that the stringer deforms in a controlled fashion to suppress or "close" cracks that are about to form—before the undesirable modes of failure form—as load is applied.

10 Claims, 15 Drawing Sheets

(51) Int. Cl.
*G06F 17/18* (2006.01)
*G06F 17/50* (2006.01)

(52) U.S. Cl.
CPC ...... *G06F 17/5009* (2013.01); *G06F 17/5018* (2013.01); *B32B 2250/20* (2013.01); *B32B 2307/544* (2013.01); *B32B 2307/546* (2013.01); *B32B 2605/18* (2013.01); *Y10T 428/24504* (2015.01)

(58) Field of Classification Search
CPC ........... B32B 2307/546; G06F 17/5018; G06F 17/5009; G06F 17/18; G06F 17/50; Y10T 428/24504
See application file for complete search history.

(56) References Cited

U.S. PATENT DOCUMENTS

| | | | |
|---|---|---|---|
| 8,551,382 | B2 | 10/2013 | Anderson et al. |
| 8,746,618 | B2 | 6/2014 | Brook et al. |
| 8,763,253 | B2 | 7/2014 | Kamaraj et al. |
| 8,862,437 | B1 | 10/2014 | Rassaian et al. |
| 2002/0031641 | A1* | 3/2002 | George ............... B32B 5/12 428/105 |
| 2006/0162456 | A1 | 7/2006 | Kennedy et al. |
| 2010/0304094 | A1* | 12/2010 | Brook ............... B29C 70/222 428/174 |
| 2011/0224952 | A1 | 9/2011 | Marasco et al. |
| 2012/0100343 | A1* | 4/2012 | Borghini-Lilli ......... B29C 70/30 428/156 |
| 2013/0231902 | A1 | 9/2013 | Luby et al. |
| 2014/0120302 | A1* | 5/2014 | Arana Hidalgo ....... B64C 1/064 428/113 |

OTHER PUBLICATIONS

Davidson, Energy Release Rate Determination for Edge Delamination under Combined In-Plane, Bending and Hygrothermal Loading. Part I—Delamination at a Single Interface, J. Composite Materials, vol. 28, No. 11 (1994), pp. 1009-1031.
Davidson et al., "An Analytical Crack-Tip Element for Layered Elastic Structures", ASME J. Applied Mechanics, vol. 62, Jun. (1995), pp. 294-305.
Groh et al., "Buckling analysis of variable angle tow, variable thickness panels with transverse shear effects", Composite Structures, vol. 107 (2013), pp. 482-493.
Krueger, "Virtual crack closure technique: History, approach, and applications", Appl. Mech. Rev., vol. 57, No. 2, Mar. (2004), pp. 109-143.
Setoodeh et al., "Design of Variable Stiffness Composite Panels for Maximum Fundamental Frequency Using Lamination Parameters", European Conference on Spacecraft Structures, Materials & Mechanical Testing 2005, Noordwijk, The Netherlands, May 10-12, 2005 (ESA SP-581, Aug. 2005).
Lachenal et al., "A non-linear stiffness composite twisting I-beam", J. Intelligent Material Systems and Structures, vol. 25(6) (2014), pp. 744-754.
Stodieck et al., "Improved aeroelastic tailoring using tow-steered composites", Composite Structures, vol. 106 (2013), pp. 703-715.
Kim et al., "Manufacturing characteristics of the continuous tow shearing method for manufacturing of variable angle tow composites", Composites: Part A, vol. 61 (2014), pp. 141-151.
GCC Patent Office Examination Report dated May 17, 2018 in GCC Patent Application No. 2016-30687 (GCC counterpart of the instant U.S. patent application).
Canadian Office Action dated Sep. 19, 2018 in Canadian Patent Application No. 2,907,916 (Canadian counterpart of the instant patent application).

* cited by examiner

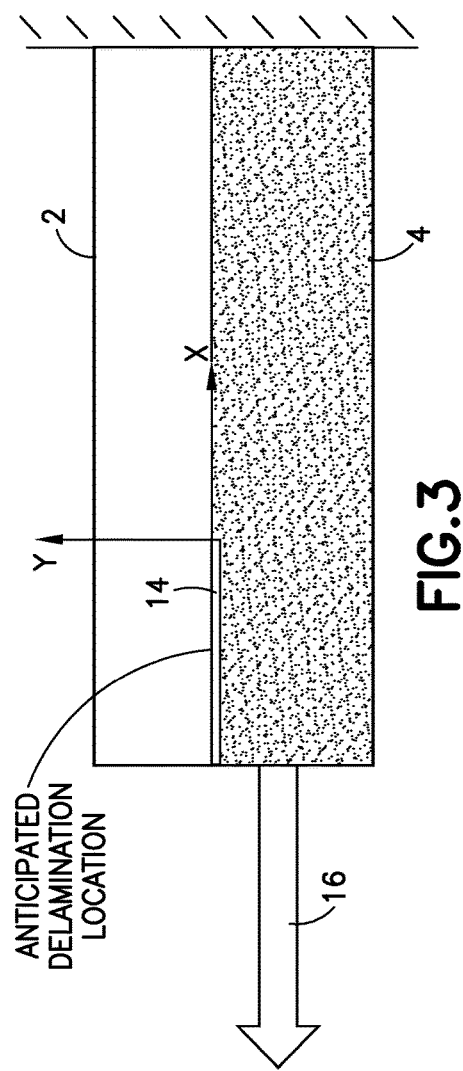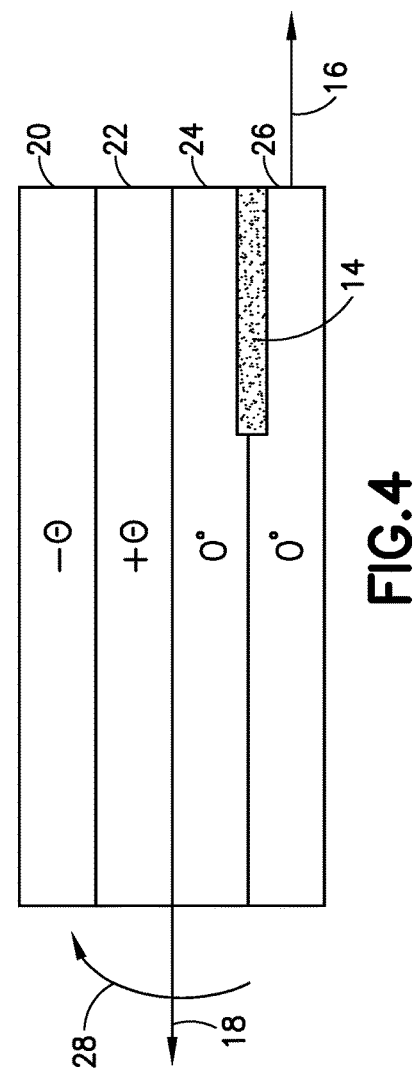

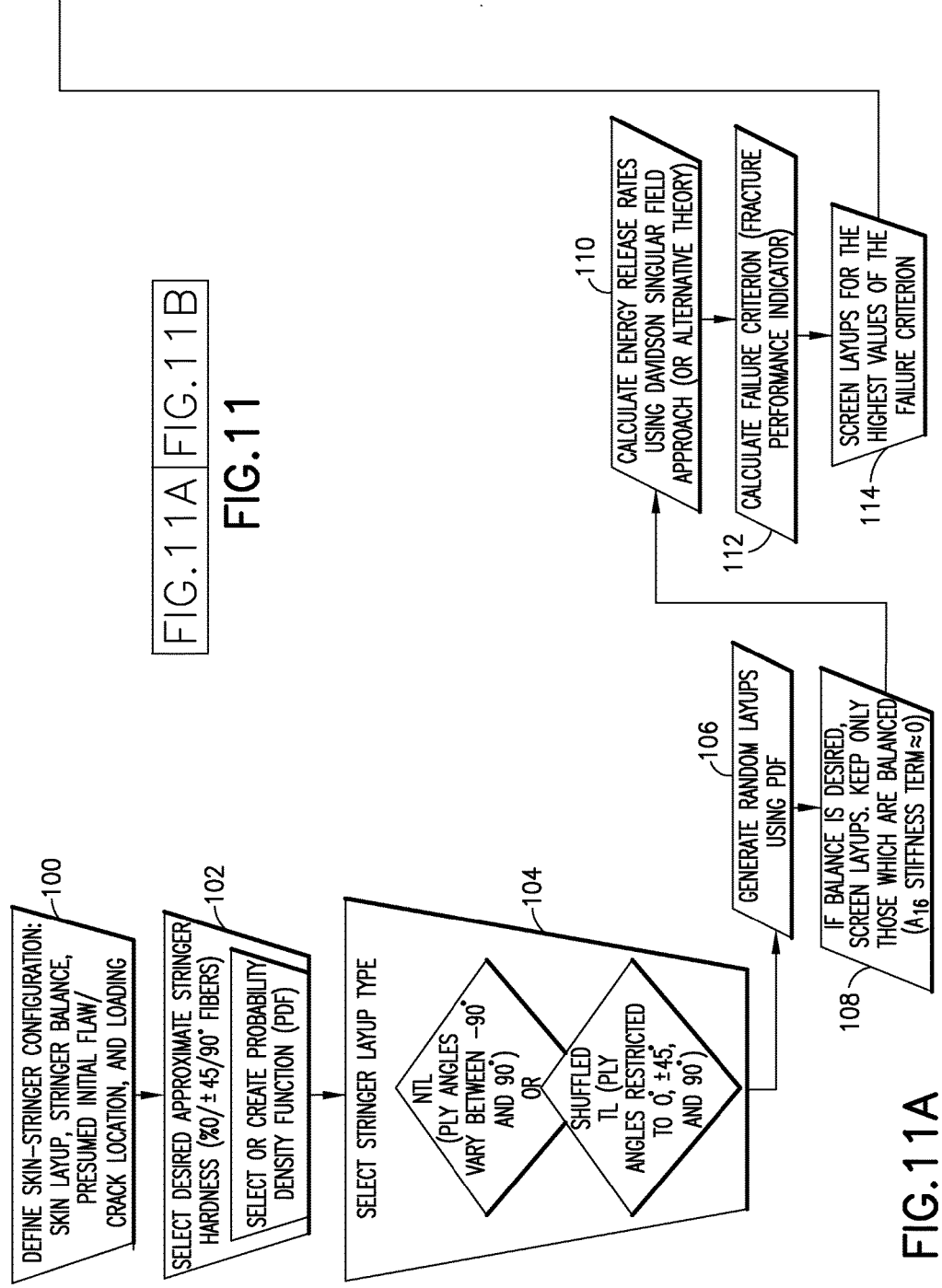

SKIN-STRINGER DESIGN FOR COMPOSITE WINGS

BACKGROUND

The present disclosure relates generally to aircraft and, in particular, to aircraft structures. Still more particularly, the present disclosure relates to stringers and other structural designs for an aircraft.

Aircraft are being designed and manufactured with increasing percentages of composite materials. Some aircraft may have more than 50 percent of their primary structures made from composite materials. Composite materials may be used in aircraft to decrease the weight of the aircraft. This decreased weight may improve payload capacities and fuel efficiencies. Further, composite materials may provide longer service life for various components in an aircraft.

Composite materials are typically tough, lightweight materials created by combining two or more dissimilar components. For example, a composite material may include fibers and resins. The fibers and resins may be combined to form a cured composite material.

Further, by using composite materials, portions of an aircraft may be created in larger pieces or sections. For example, a fuselage in an aircraft may be created in cylindrical sections that may be put together to form the fuselage of the aircraft. Other examples may include, without limitation, wing sections joined to form a wing or stabilizer sections joined to form a stabilizer.

A stringer is an example of a component that may be manufactured from composite materials. A stringer is an elongate member and is configured for attachment to another structure, such as a panel. For example, a stringer may be attached to a skin panel for an aircraft. This skin panel may be used in a wing, fuselage, or other component in the aircraft. The stringer also may help carry and/or transfer loads. For example, a stringer may transfer a load from a skin panel to another structure. This other structure may be, for example, a frame or a rib.

Composite skin-stringer interaction structures are susceptible to delamination under dominant loads. The problem of skin-stringer interface cracking (delamination) is detrimental to the integrity of an aircraft structure such as a wing. Traditional design rules (balance or symmetry) in composite layups are used to avoid undesired failure modes and coupling effects, but these design rules restrict the stacking sequences.

Existing solutions include increasing the thickness of stringer and/or skin at a trouble spot; and redesigning the skin and stringers next to the problem area to diverge the load from the trouble spot. These solutions lead to weight penalty, manufacturing costs, and additional time spent on redesign.

It would be advantageous to provide skin-stringer structures that are less susceptible to interface cracking.

SUMMARY

The subject matter disclosed in detail below comprises composite skin-stringer structures which reduce or eliminate the risk of delamination at the skin-stringer interface. This can be accomplished by arranging ply directions (i.e., the angles of the fiber paths of the ply) in a layup in a way such that for the dominant loading, the skin and stringer will each deform in a way that reduces relative opening (fracture Mode I) and/or sliding (fracture Mode II) and/or scissoring (fracture Mode III) at the skin-stringer interface. This is possible when coupling between specific deformations modes is purposefully activated instead of being suppressed. Techniques are proposed herein to arrange the stacking sequences of the composite laminates to take advantage of non-zero elements of a coupling stiffness matrix.

The proposed solution resolves the existing problem by adjusting the ply directions in the stringer so that the stringer deforms in a controlled fashion to suppress or "close" cracks that are about to form—before the undesirable modes of failure form—as load is applied. This design will enable a reduction in the weight of the skin-stringer interface structure as well as eliminate the need to re-design the surrounding structure. The adjusted ply directions can be realized using steered fiber technology to fabricate the stringer. Implementation of the methods of design and manufacture disclosed herein can avoid costly sequential design changes in late production phases.

As used herein, the terms "ply direction" and "ply angle" are used synonymously and refer to the angle of parallel fibers in a ply, measured relative to a reference direction or axis. As used herein, the term "symmetric laminate" means a laminate in which for every ply above the laminate midplane, there is an identical ply (material and ply angle) an equal distance below the midplane. (Accordingly, as used herein, the term "unsymmetric laminate" means a laminate which is not a symmetric laminate.) As used herein, the term "balanced laminate" means a laminate in which for every ply having a +θ ply angle, there is another ply having a −θ ply angle somewhere in the laminate. This pair of plies having ply angles of ±θ need not be adjacent to each other. These most common definitions of symmetry and balance are geometrically motivated. A more general definition would call a stacking sequence symmetric if the resulting coupling or B matrix (described below) vanishes. Similarly, a stacking sequence might be called balanced if the resulting in-plane/shear coupling ($A_{16}$, $A_{26}$ elements of the A matrix described below) vanish. The geometrically inspired definitions are sufficient but not necessary for the B matrix or $A_{16}$, $A_{26}$ elements of the A stiffness matrix to vanish.

One aspect of the subject matter disclosed in detail below is a composite member having at least one flange, the at least one flange comprising a composite laminate, the composite laminate comprising a stack of plies of composite material having a free edge, the plies of the stack comprising fibers oriented at respective ply angles or fibers steered at varying angles within a ply, said fibers being arranged to cause coupling of first and second deformation modes in a manner that suppresses a tendency toward delamination at an interface of a first ply of the stack and a portion of a composite skin to which the at least one flange is bonded while that portion of the composite skin is being loaded in a direction perpendicular to the free edge of the at least one flange. In some cases, the first deformation mode is an axial deformation mode and the second deformation mode is a bending deformation mode. In accordance with some embodiments, the composite laminate of the at least one flange is unsymmetric and unbalanced or balanced. In some embodiments, at least one ply of the plies of the stack has a ply angle which is not equal to any one of the following ply angles: 0, ±45 and ±90 degrees. Such embodiments are called non-traditional layups. Each ply interface of the composite laminate of the at least one flange has a failure criterion value (combination of the Mode I, II, and III energy release rates) less than a critical failure criterion value associated with a start of free edge delamination.

Another aspect of the subject matter disclosed below is a composite structure comprising a first composite laminate comprising a first stack of plies having a free edge and a second composite laminate comprising a second stack of plies, the first and second composite laminates being bonded at an interface adjacent to the free edge, wherein the plies of the first stack comprise fibers oriented at respective ply angles or fibers steered at varying angles within a ply, said fibers being arranged to cause coupling of first and second deformation modes in a manner that suppresses a tendency toward delamination at the interface when the second composite laminate is loaded in a direction perpendicular to the free edge. In accordance with some embodiments, the first composite laminate forms a flange of a stringer and the second composite laminate forms a skin to which the stringer is bonded. The first composite laminate is unsymmetric and unbalanced or balanced. In some embodiments, at least one ply of the plies of the first stack has a ply angle which is not equal to any one of the following ply angles: 0, ±45 and ±90 degrees. Each ply interface of the first composite laminate has a failure criterion value (combination of the Mode I, II, and III energy release rates) less than a critical failure criterion value associated with a start of free edge delamination.

A further aspect is a method for suppressing interfacial delamination in a composite structure comprising a first composite laminate comprising a first stack of plies having a free edge and a second composite laminate comprising a second stack of plies, the first and second composite laminates being bonded at an interface adjacent to the free edge, the method comprising: defining characteristics of the second composite laminate; defining desired characteristics of the first composite laminate; defining predicted loading and delamination location; selecting a probabilistic or optimization strategy; adjusting ply angles of a candidate layup of the first composite laminate toward satisfying the desired characteristics using the selected strategy; and verifying that the candidate layup satisfies the desired characteristics, wherein the desired characteristics include suppression of delamination at the interface of the first and second composite laminates in the vicinity of the free edge of the first composite laminate, and wherein at lest the adjusting and verifying steps are performed by a computer system.

The method may further comprise manufacturing a first composite laminate that satisfies the desired characteristics. The verifying step comprises calculating a failure criterion value (combination of the Mode I, II, and III energy release rates) associated with delamination at the interface of the first and second composite laminates and calculating a failure criterion value associated with free edge delamination at respective ply interfaces of the first composite laminate. When the probabilistic strategy is selected, the adjusting step comprises generating random layups for the first composite laminate using a probability density function, and the verifying step comprises discarding randomly generated layups which do not satisfy one or more of the desired characteristics. When the optimization strategy is selected, the adjusting step comprises adjusting an optimization problem to account for violated constraints.

Other aspects of composite skin-stringer structures and methods for their design are disclosed and claimed below.

BRIEF DESCRIPTION OF THE DRAWINGS

FIG. 3 is a diagram representing a portion of the composite skin-stringer interface depicted in FIG. 2. An anticipated delamination location is indicated by a region where the edge of the stringer flange has separated from the skin.

FIG. 4 is a diagram showing the construction of a four-ply laminate (unsymmetric but balanced) with variable ply angle θ. A delamination/flaw location is indicated along the interface between two plies having ply angles=0°. The arrow on the right-hand side represents a tension load; the arrows on the left-hand side represent reaction loads.

Reference will hereinafter be made to the drawings in which similar elements in different drawings bear the same reference numerals.

DETAILED DESCRIPTION

Various embodiments of methods for designing composite skin-stringer structures having improved resistance to delamination will be described in detail below. The following detailed description is illustrative in nature and not intended to limit claim coverage to the disclosed embodiments or to the disclosed applications and uses of the disclosed embodiments.

Figure 1:
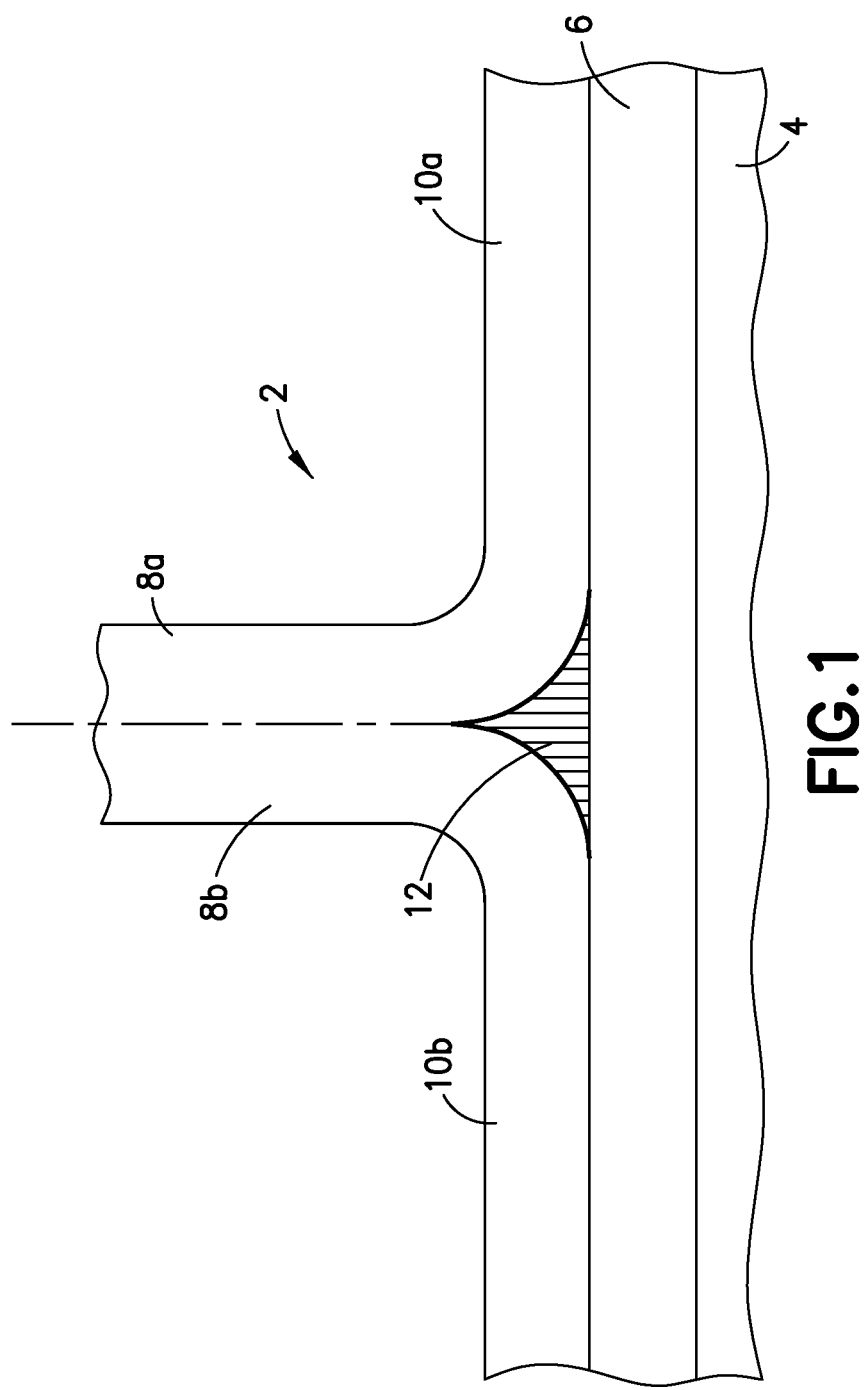
FIG. 1 is a diagram representing an end view of a typical interface between a T-shaped stringer and a skin made of composite material.

FIG. 1 is a diagram representing an end view of a typical interface between a blade stringer 2 and a skin 4, each made of composite material. A blade stringer is shown for the purpose of illustration only. The analysis disclosed herein can be applied with equal efficacy to other types of composite stringers.

Referring to FIG. 1, the blade stringer 2 comprises a formed sheet of generally elongated, adjacent, parallel blades 8a and 8b. Each blade 8a and 8b may comprise a respective multiplicity of composite plies between respective layers of resin-infused fabric. The blade stringer 2 further comprises a pair of flanges 10a and 10b which extend outwardly from the respective blades 8a and 8b at respective blade/flange junctions. The plane of each flange 10a and 10b may be disposed in generally perpendicular relationship with respect to the plane of the corresponding blade 8a, 8b. The blade stringer 2 further comprises a base charge 6. The flanges 10a and 10b are bonded to the base charge 6, which is in turn bonded to the skin panel 4. A channel bounded by the blade/flange junctions and the base charge 6 is filled with a noodle 12 made of composite material.

To further illustrate the structure of the blade stringer 2, one exemplary embodiment might have a flange 10a consisting of 16 plies of composite material sandwiched between first and second plies of fabric, whereas the base charge 6 might consist of another 16 plies sandwiched between third and fourth plies of fabric, the second ply of fabric of the flange 10a being bonded to the third ply of fabric of the base charge 6. The first and fourth plies of fabric might have warp and weft yarns oriented at ±45°. In the case of traditional laminates, the 32 plies may have ply angles of 0°, ±45°, and ±90°; in the case of non-traditional laminates, the 32 plies may have ply angles of 0°, ±45°, ±90°, and other angles.

Figure 2:
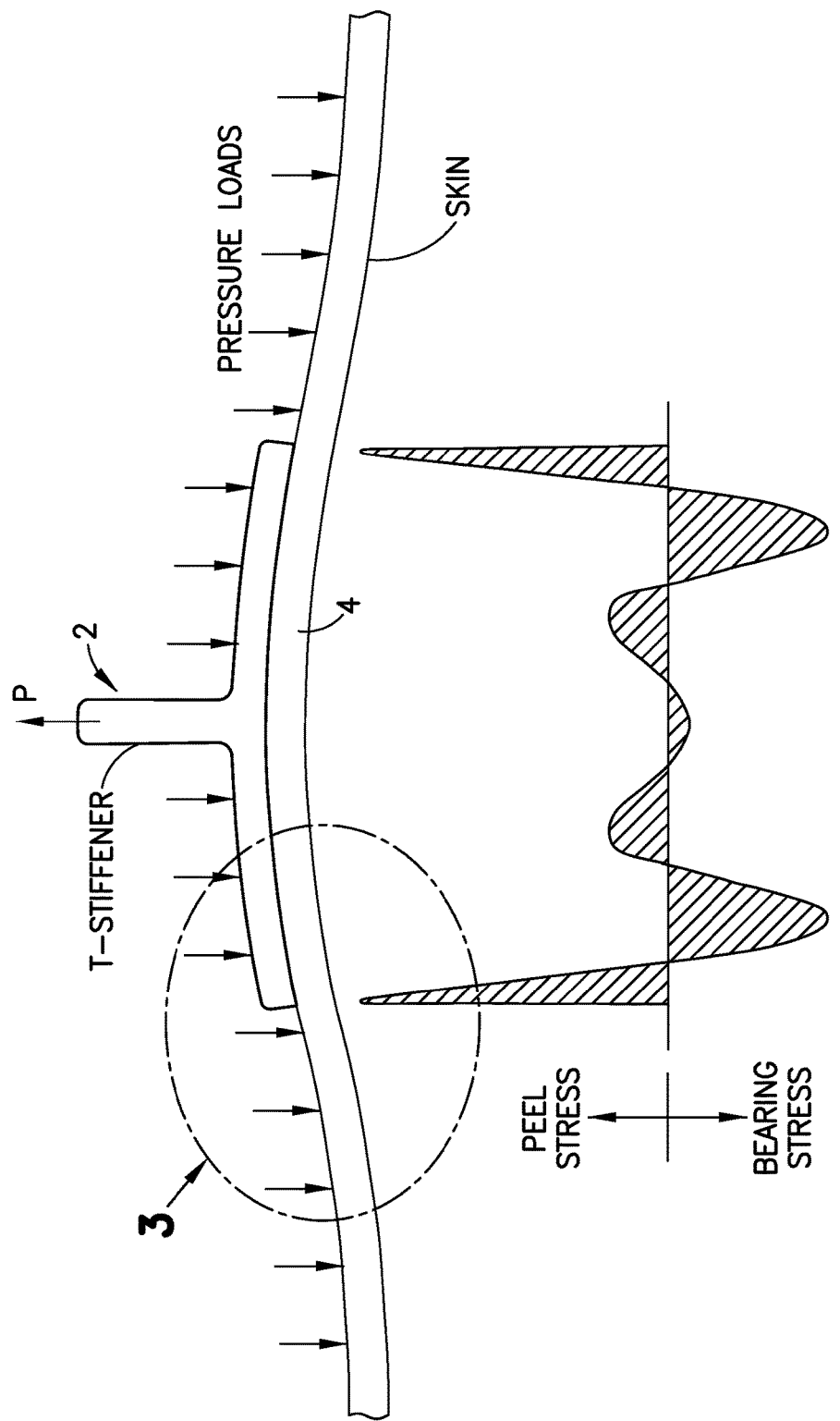
FIG. 2 includes a diagram representing an end view of a composite skin-stringer structure that is being subjected to pressure loads (indicated by arrows) and a graph representing stresses across the skin-stringer interface depicted in the diagram.
Figure 5:
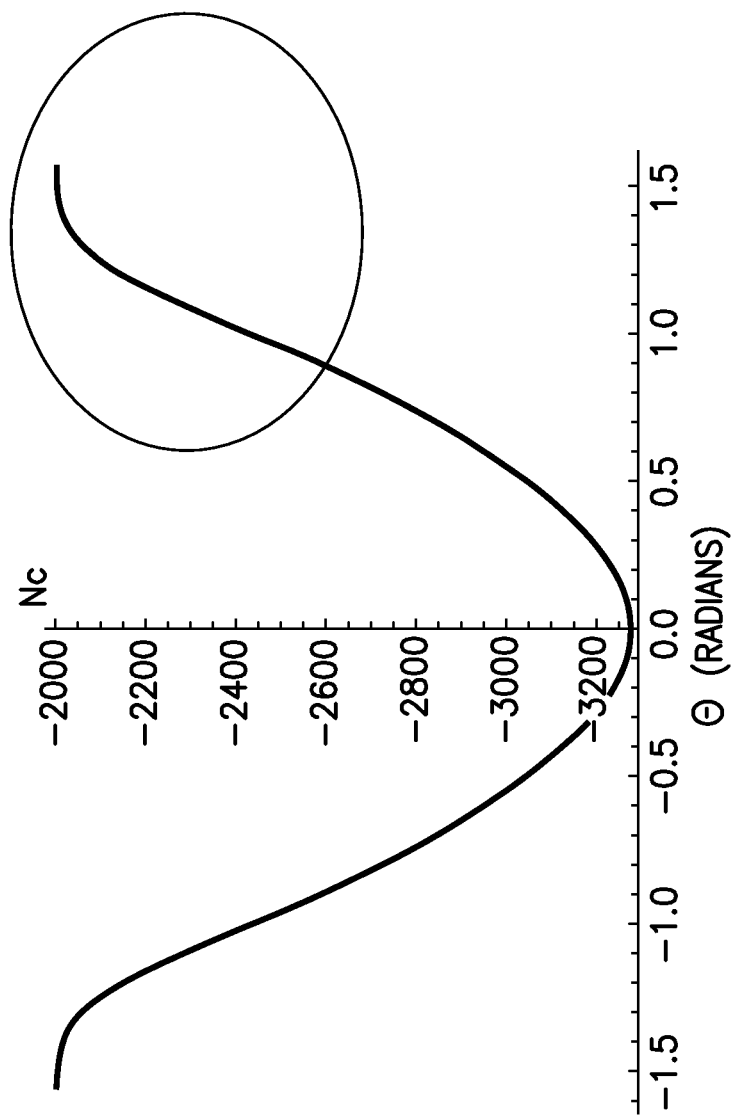
FIG. 5 is a graph of concentrated crack tip load $N_c$ versus ply angle θ for the four-ply laminate depicted in FIG. 4.
Figure 6:
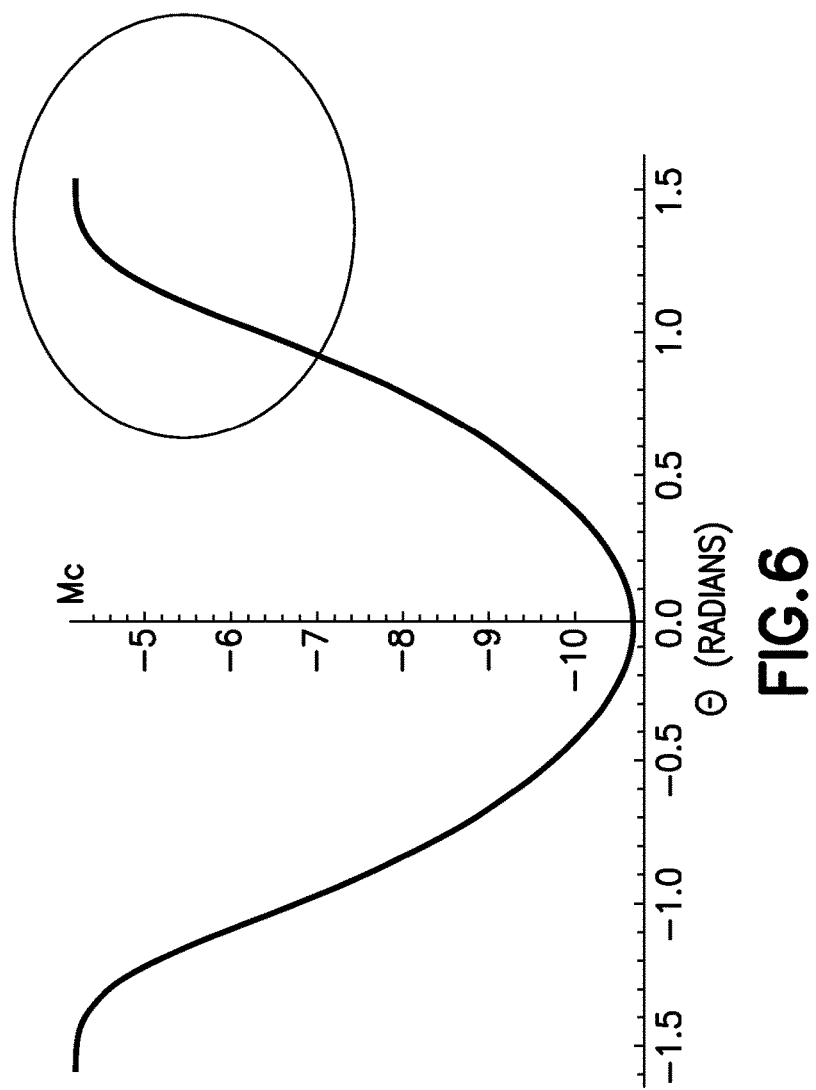
FIG. 6 is a graph of concentrated crack tip moment $M_c$ versus ply angle θ for the four-ply laminate depicted in FIG. 4.

FIG. 2 includes a diagram representing an end view of a composite skin-stringer structure that is being subjected to pressure loads (indicated by arrows) and a graph representing stresses across the skin-stringer interface depicted in the diagram. In this example, the composite skin-stringer structure again comprises a blade stringer 2 having an inverted T-shape and a skin panel 4. The blade stringer 2 is bonded to the skin panel 4. Under certain circumstances, when the skin panel 4 is subjected to an axial load, the axial loading may cause the blade stringer 2 to delaminate from the skin panel 4, especially in the areas where the maximum peel stress occurs (see graph in FIG. 2). This phenomenon was simulated by applying an axial load to the skin layup while the stringer is unloaded.

The anticipated delamination location, when an axial load is applied to the skin layup, is indicated by gap 14 in FIG. 3. Arrow 16 in FIG. 3 indicates a tensile axial load applied to the skin 4. However, the axial load could in the alternative be compressive. The problem of skin-stringer interface cracking (i.e., delamination) is detrimental to the integrity of the composite structure. The design process disclosed herein mitigates the problem of delamination by adjusting the ply directions in the stringer so that the stringer deforms in a controlled fashion to suppress or "close" cracks that are about to form (before the undesirable modes of failure form) as load is applied.

The basic concept of adjusting ply directions to suppress delamination will now be described with reference to FIGS. 4 through 9 for a simple example in which two adjacent plies 20 and 22 at the top of a balanced four-ply laminate have ply angles of −θ and +θ respectively. However, it should be appreciated that this generic 4-ply laminate is just an example laminate intended simply to illustrate the concept. Its stacking sequence is one example of how ply angles may be selected to produce asymmetry that suppresses delamination. It is not necessary that plies 20 and 22 have opposite ply angles so long as the overall effect of the selected ply angles is to produce asymmetry that suppresses delamination. Furthermore, it should be appreciated that the ply angles of this 4-ply laminate are chosen such that asymmetry suppresses delamination.

Most composite laminates are highly anisotropic. Anisotropy can be used to control dynamic mechanical behavior in a continuum. In practice, composite laminates consist of dozens to hundreds of stacked layers or plies. It is well known that mechanical behavior of individual anisotropic layers in a composite laminate can be used to model the mechanical response of the laminate. This allows designers to tailor the elastic properties and orientation of each layer (i.e., ply) so that the mechanical response of the composite laminate will be optimized.

It is well known that the relations between resultants (in-plane forces N and moments M) and strains (strains $\varepsilon^0$ and curvatures k) in a composite laminate can be characterized by forming stiffness matrices A, B and D and then substituting these stiffness matrices into the equation that relates known in-plane strains $\varepsilon^0$ and curvatures k to unknown in-plane loads N and moments M. The resulting equation is:

$$\left\{ \begin{array}{c} \{N\} \\ \{M\} \end{array} \right\} = \left[ \begin{array}{cc} [A] & [B] \\ [B] & [D] \end{array} \right] \left\{ \begin{array}{c} \{\varepsilon^0\} \\ \{k\} \end{array} \right\}$$

where A is called the extensional stiffness, B is called the coupling stiffness, and D is called the bending stiffness of the laminate. Forming stiffness matrices A, B and D is an important step in the analysis of composite laminates. The A, B and D matrices for a composite laminate can be used to control, and hence design, the mechanical behavior of a laminate.

FIG. 4 is a diagram showing the construction of a four-ply laminate (unsymmetric but balanced) with variable ply angle θ. This four-ply laminate represents a generic laminate, where the top three plies 20, 22 and 24 are a representation of an entire stringer (comprised of a total of three plies) and the bottom ply 26 is a representation of an entire skin (comprised of a total of one ply). Each value of angle θ corresponds to a separate laminate with constant angles within each ply. For example, if θ=0°, then the ply angles of this laminate will be [0°, 0°, 0°, 0°], whereas if θ=5°, then the ply angles of this laminate will be [−5°, 5°, 0°, 0°]. The angle θ does not vary within a single ply; all fibers within a single ply have the same orientation angle θ. When the angle θ is varied, all fibers move to the new value of θ.

The four-ply laminate depicted in FIG. 4 illustrates how the crack closing mechanism disclosed herein works. A delamination/flaw location 14 is indicated along the interface between plies 24 and 26 having ply angles θ=0°. The arrow 16 on the right-hand side in FIG. 4 represents a tension load applied to the ply 26 that represents a skin; the arrows 18 and 28 on the left-hand side represent reaction loads. The ply angles of plies 20, 22, and 24 which represent a stringer may be selected so that delamination will not occur at location 14 when the axial load is applied to ply 26, whereby such delamination will not occur for a given ply angle of ply 26 which is representative of a skin.

The plots shown in FIGS. 5 through 9 present values of various parameters which characterize mechanical properties of the four-ply laminate depicted in FIG. 4 and which are a function of ply angle. The baseline to which everything is compared is a symmetric layup (i.e., when the ply angle θ=0°). When one starts to change the ply angle θ, the layup becomes unsymmetric. This, in conjunction with the ply angles selected for plies 20, 22, and 24 in FIG. 4 which are representative of a stringer for a given ply angle for ply 26 in FIG. 4 which is representative of a skin, causes changes in the crack tip load, crack tip moment, and Modes I and II energy release rates respectively, i.e., they are reduced (in absolute value), as indicated by the circled regions in FIGS. 5, 6 and 7. Reductions in the crack tip load, crack tip moment, and Modes I and II energy release rates indicate stringer designs which are less susceptible to delamination.

The crack tip force $N_c$ and crack tip moment $M_c$ are quantities that are assumed to exist in the idealization of the crack tip in the Davidson formulation (described in more detail below). In the plots for $N_c$ and $M_c$ seen in FIGS. 5 and 6 respectively, the horizontal axes represent the ply angle θ in radians. The ply angle θ is a measure of the degree of asymmetry in the laminate. When θ is zero, the laminate is symmetric; and when θ increases, the laminate becomes unsymmetric. These plots for $N_c$ and $M_c$ indicate that when θ increases, $N_c$ and $M_c$ are reduced in magnitude. Therefore the stated reductions in $N_c$ and $M_c$ are with respect to their values at θ=0°. The cause of the reduction in $N_c$ and $M_c$ is the changes in the laminate stiffness properties associated with the laminate becoming unsymmetric. It should be emphasized that only special selection of ply angles for plies 20, 22, and 24 in FIG. 4 which are representative of a stringer, and not just the selection of angle θ, will result in a reduction in $N_c$ and $M_c$, for a given ply angle for ply 26 in FIG. 4 which is representative of a skin.

The laminate shown in FIG. 4 represents a three-dimensional portion of a crack-tip region in a general interfacial fracture problem. Classical plate theory can be used to predict the overall deformations and strain energies in this laminate. It has been shown that the loading on a crack-tip element which produces a stress singularity can be fully characterized in terms of the concentrated crack tip force $N_c$ and moment $M_c$. The energy release rate G of the crack-tip element may be obtained through a modified virtual crack closure method. The total energy release rate $G=G_I+G_{II}+G_{III}$, where $G_{III}=0$ for the two-dimensional case discussed, and $G_I$ and $G_{II}$ are the associated Mode I and Mode II energy release rates defined by Davidson et al. in an article entitled "An Analytical Crack-Tip Element for Layered Elastic Structures," ASME Journal of Applied Mechanics, Vol. 62, June (1995), pp. 294-305. More specifically, $G_I$ is the fracture Mode I component (opening mode), $G_{II}$ is the fracture Mode II component (sliding mode), and $G_{III}$ is the fracture Mode III component (scissoring mode).

Figure 7:
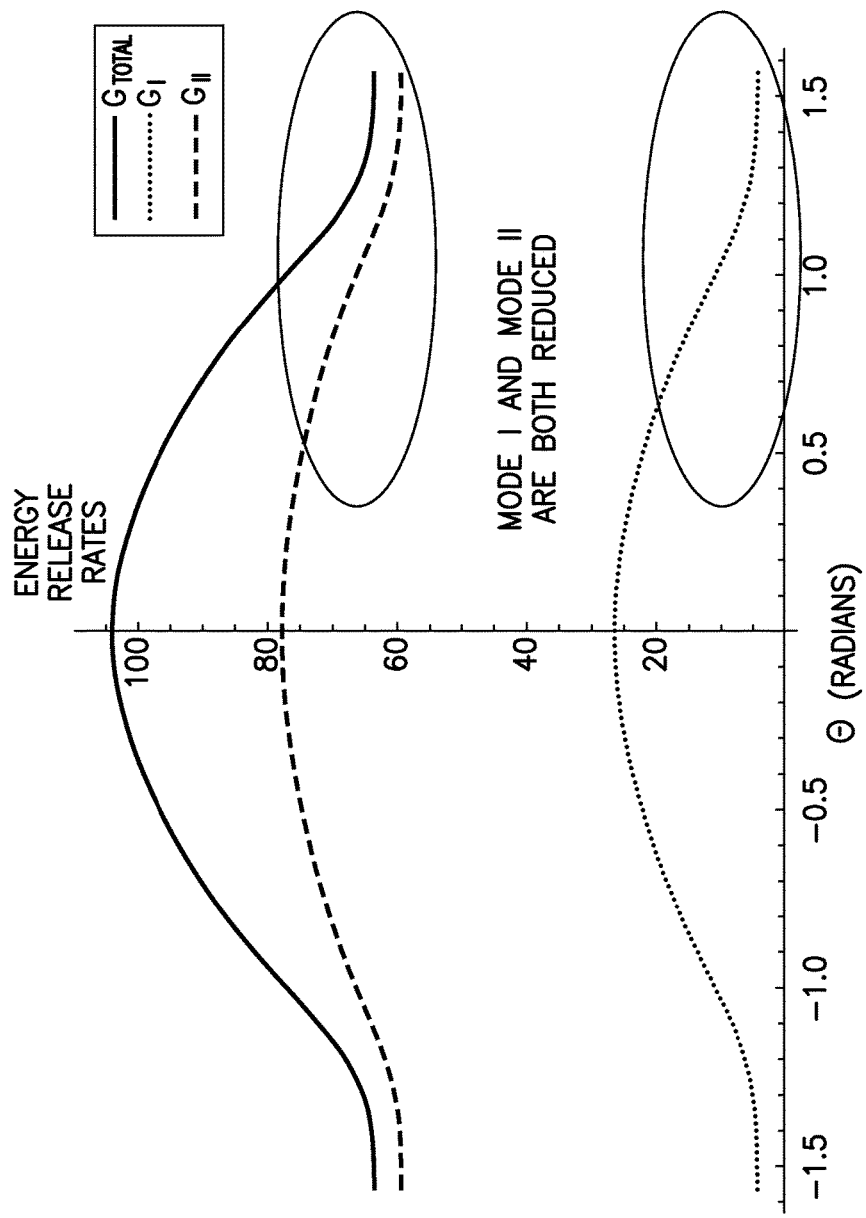
FIG. 7 is a graph of energy release rates versus ply angle θ for the four-ply laminate depicted in FIG. 4.
Figure 8:
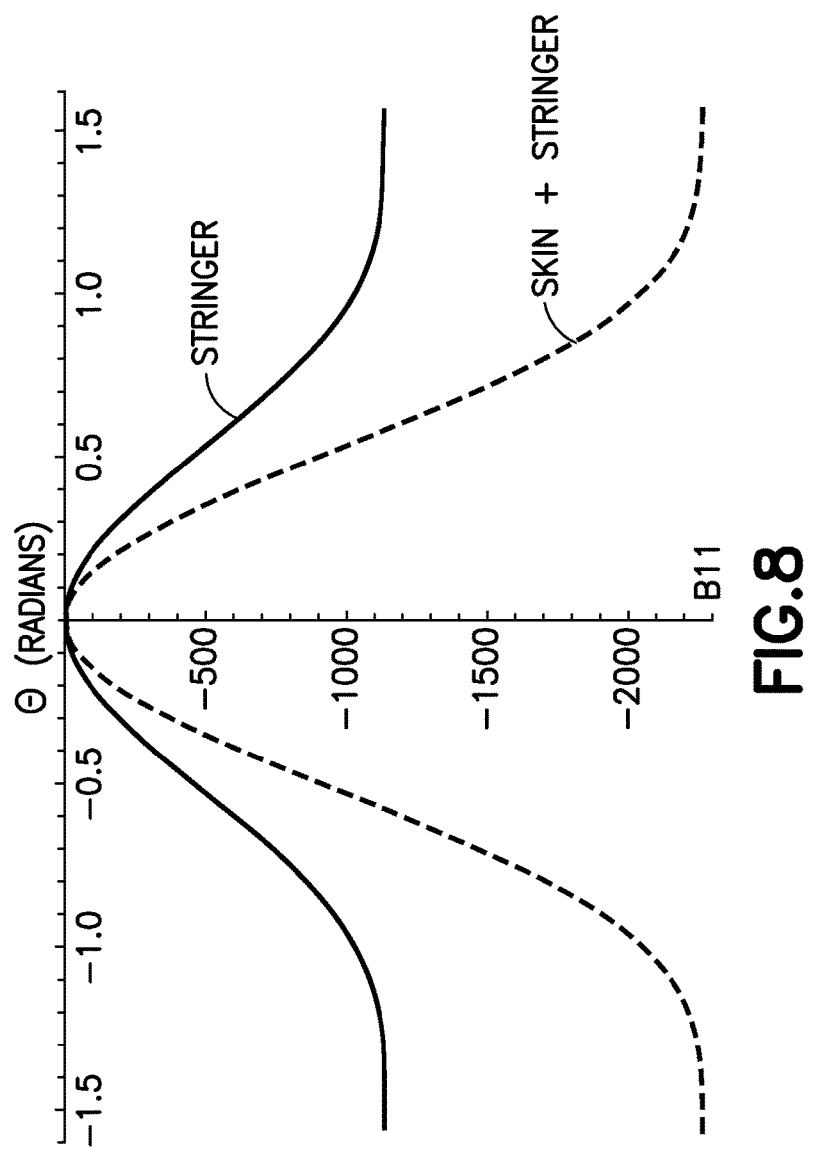
FIG. 8 is a graph of element $B_{11}$ of the coupling stiffness matrix versus ply angle θ for a stringer alone and for a skin-stringer structure.
Figure 9:
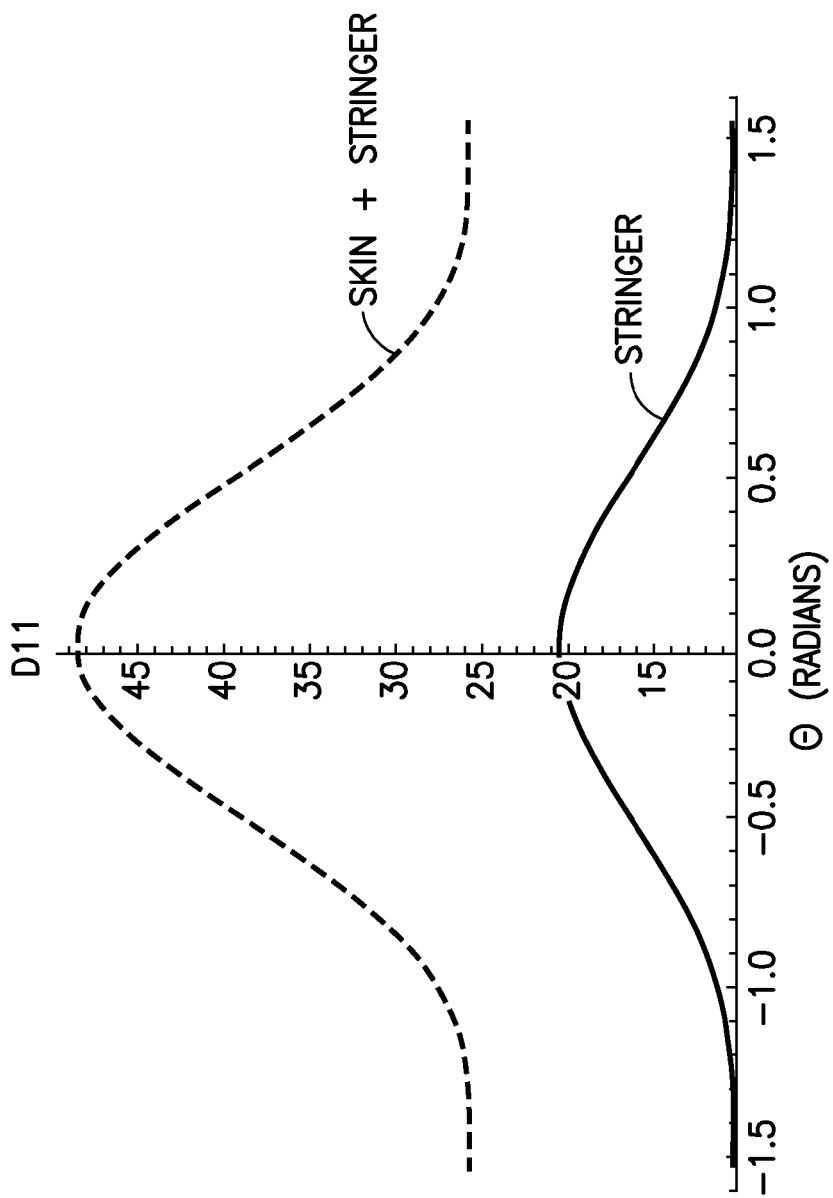
FIG. 9 is a graph of element $D_{11}$ of the bending stiffness matrix versus ply angle θ for a stringer alone and for a skin-stringer structure.

FIG. 7 is a graph of energy release rates G, $G_I$ and $G_{II}$ ($G_{III}=0$) versus ply angle θ for the four-ply laminate depicted in FIG. 4. As seen in FIG. 7, these energy release rates decrease as the ply angle θ increases. Also other parameters change as the ply angle changes. For example, FIG. 8 is a graph of element $B_{11}$ of the coupling stiffness matrix versus ply angle θ for a stringer alone (solid curve) and for a skin-stringer structure (dashed curve), whereas FIG. 9 is a graph of element $D_{11}$ of the bending stiffness matrix versus ply angle θ for a stringer alone (solid curve) and for a skin-stringer structure (dashed curve).

$B_{11}$ and $D_{11}$ are respective terms of the plate stiffness matrix of classical laminated plate theory. $B_{11}$ is one of the indicators of the asymmetry of the laminate and $D_{11}$ is one of the indicators of the bending rigidity of the laminate. The curve labeled "STRINGER" represents the $B_{11}$ values calculated for a laminate comprised of the top three plies 20, 22 and 24 shown in FIG. 4. The curve labeled "SKIN+STRINGER" represents the $B_{11}$ values calculated for the whole laminate, i.e., a laminate comprising all four plies 20, 22, 24 and 26 shown in FIG. 4. The curves for $D_{11}$ are analogous.

Figure 10:
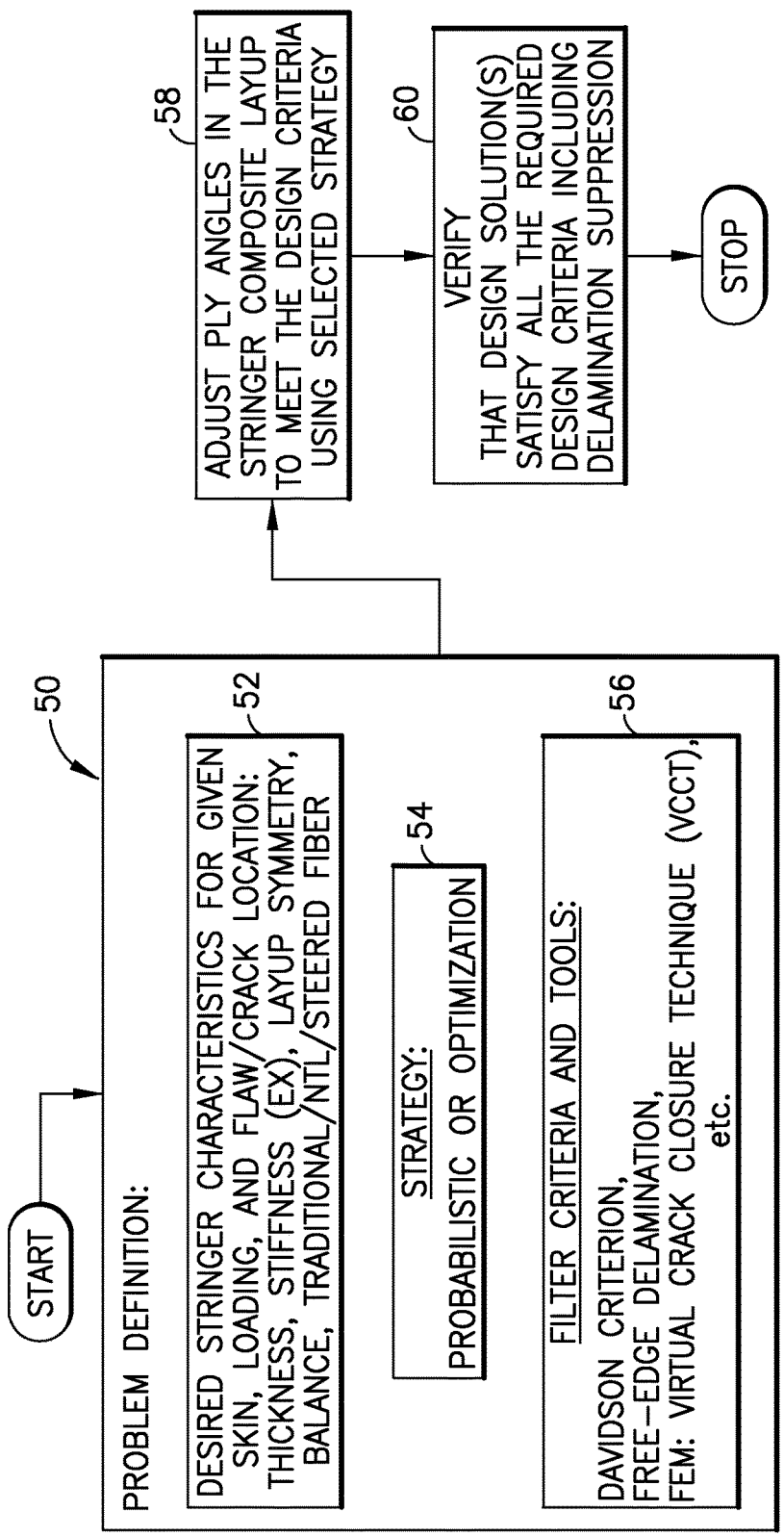
FIG. 10 is a flowchart showing a process flow for designing composite skin-stringer structures having improved resistance to delamination.

FIG. 10 is a flowchart showing a process flow for designing composite skin-stringer structures having improved resistance to delamination. The design process begins with a definition of the problem (process 50). The problem definition process 50 includes the following steps: selection of the desired stringer characteristics for given skin, loading and flaw/crack location (step 52); selection of either a probabilistic or an optimization strategy (step 54); and selection of filter criteria and tools (step 56).

The stringer characteristics selected in step 52 may include thickness, stiffness, layup symmetry, balance, and laminate type. In some cases, the relevant laminate types are a traditional laminate having ply angles 0°/±45°/90° only or a non-traditional laminate (NTL) which may have ply angles different than and in addition to ply angles 0°/±45°/90°. In other cases, the relevant laminate type is a fiber-steered laminate.

Still referring to FIG. 10, step 56 may include any of the following: using the Davidson failure criterion K, which is a fracture performance indicator akin to a margin of safety MS (MS=K−1); using the free edge delamination approach disclosed by Davidson in an article entitled "Energy Release Rate Determination for Edge Delamination Under Combined In-Plane, Bending and Hygrothermal Loading. Part I—Delamination at a Single Interface," Journal of Composite Materials, Vol. 28, No. 11 (1994), pp. 1009-1031; using a finite element analysis-based implementation of the virtual crack closure technique; etc.

After problem definition, a multiplicity of candidate stringer layups are created and filtered based on the criterion that delamination of the stringer from the skin be suppressed. During generation of the candidate stringer layups, the ply angles and stacking in each stringer composite layup are adjusted to meet the design criteria using the selected strategy (step 58). NTL ply angles allow for more design criteria to be satisfied at the same time. Coupling between specific deformation modes is purposefully activated to suppress delamination (non-zero elements of the B stiffness matrix). After adjustments have been made, the resulting design solution(s) is tested to verify that all of the required design criteria have been satisfied, including delamination suppression (step 60).

Figure 14:
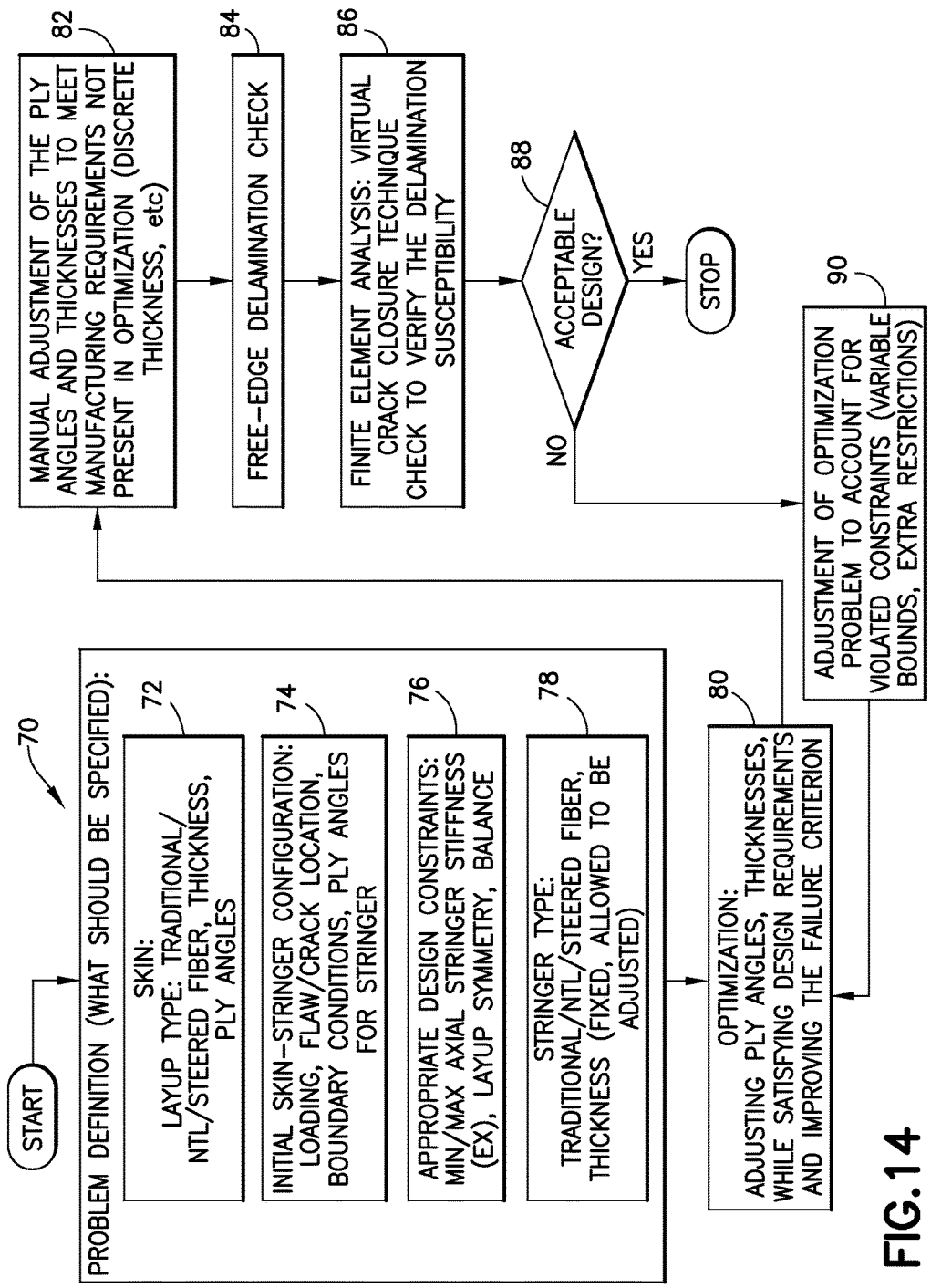
FIG. 14 is an analysis flowchart showing steps of a method for designing composite skin-stringer structures having improved resistance to delamination using an optimization strategy.

Two embodiments of a process for designing composite skin-stringer structures having improved resistance to delamination will hereinafter be described with reference to FIGS. 11 and 14 respectively. FIG. 11 shows steps of a design process that employs a probabilistic strategy. FIG. 14 shows steps of a design process that employs optimization and finite element analysis.

Figure 11B:
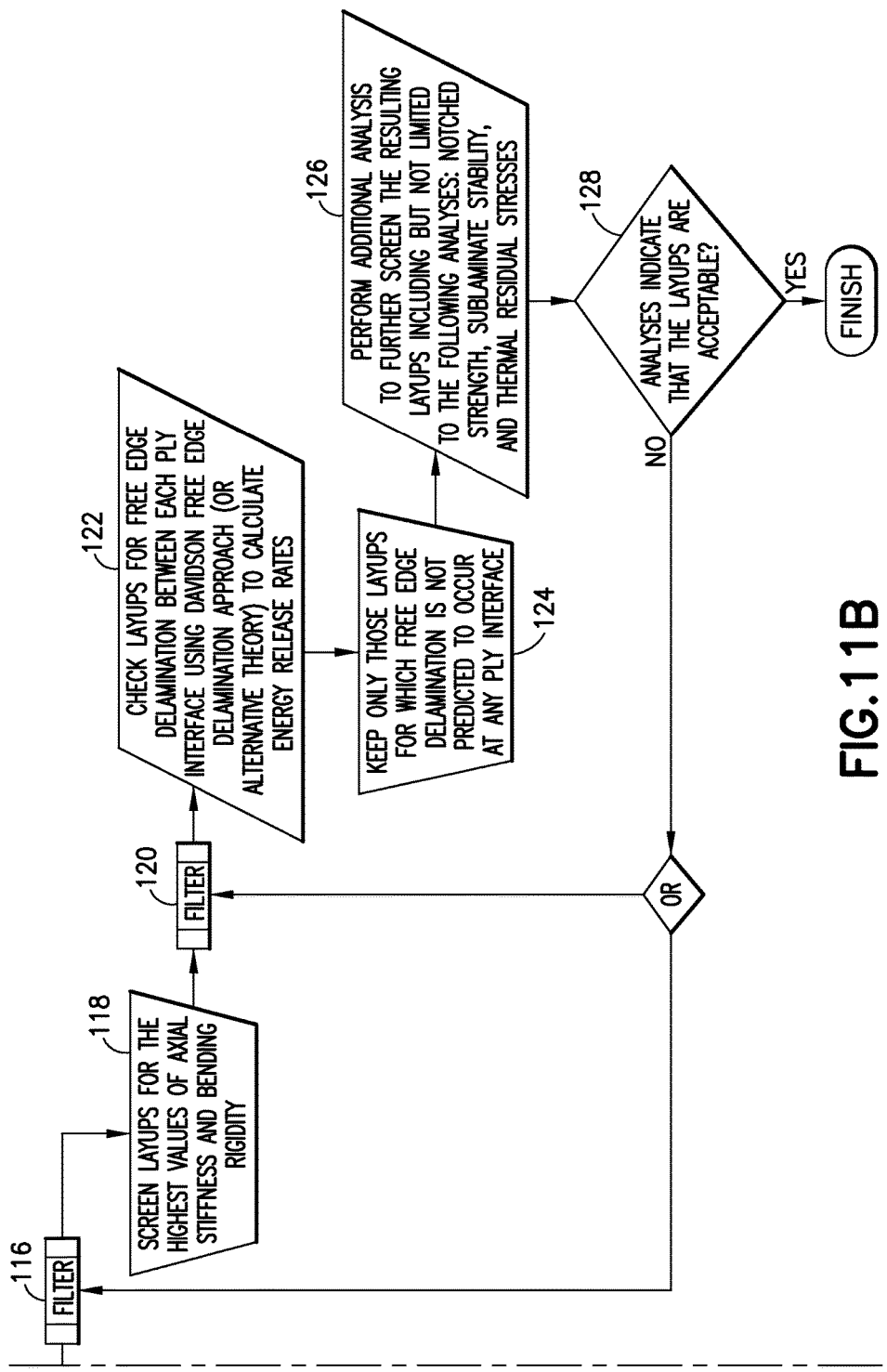
FIG. 11 comprises respective sheets designated FIGS. 11A and 11B, which form an analysis flowchart showing steps of a method for designing composite skin-stringer structures having improved resistance to delamination using a probabilistic strategy.

Respective portions of the analysis flowchart of FIG. 11 appear on separate sheets (i.e., FIGS. 11A and 11B). A first part of the flowchart is presented in FIG. 11A; a second part of the flowchart is presented in FIG. 11B. The flowchart shows steps of a method for designing composite skin-stringer structures having improved resistance to delamination using a probabilistic strategy. As will be explained in more detail below, this design method generates layups by randomly selecting the ply angles (i.e., directions) for each ply. The design process depicted in FIG. 11 enables the design of a stringer that is superior to a baseline layup in terms of axial stiffness, bending rigidity and delamination performance (i.e., failure criterion).

For many applications, it is preferred that the composite laminate be designed to provide a so-called "hard" layup.

"Hard" or "soft" refers to the axial stiffness of the composite laminate. A "hard" stringer is one with a high axial stiffness, or high modulus of elasticity, e.g., in the spanwise direction of a wing. However, it should be appreciated that the design process and concepts disclosed herein can also be employed in the design and manufacture of the other layups that are not hard laminates.

The start of the hard layup design process using the probabilistic strategy is shown in FIG. 11A. In initial step 100, the desired hard skin-stringer configuration is defined in terms of at least the following specifications: skin layup, stringer balance, presumed initial flaw/crack location, and loading.

In the next step 102, a desired approximate stringer hardness is selected. A "hard" laminate is achieved by having a high percentage of the plies in the laminate being oriented closer to zero degrees. (For example, zero degrees represents the spanwise direction of a wing.) Thus, when there are many 0° plies (or plies which are close to 0°), the layup is considered "hard"; when there are few plies close to the 0° direction, the layup is considered "soft". There is no precisely defined boundary between the two. One possible metric of hardness may be defined as the ratio between axial stiffness in, e.g., the spanwise and chordwise directions of a wing.

Furthermore, "%0/±45/90°" in step 102 refers to a metric known as the "effective percentages of 0, ±45, and 90-degree fibers." This metric applies to traditional laminates as well as non-traditional laminates. One can calculate the effective percentages of 0, ±45, and 90-degree fibers even if the fibers in the laminate are not oriented at the 0, ±45, and 90-degree directions.

Figure 12:
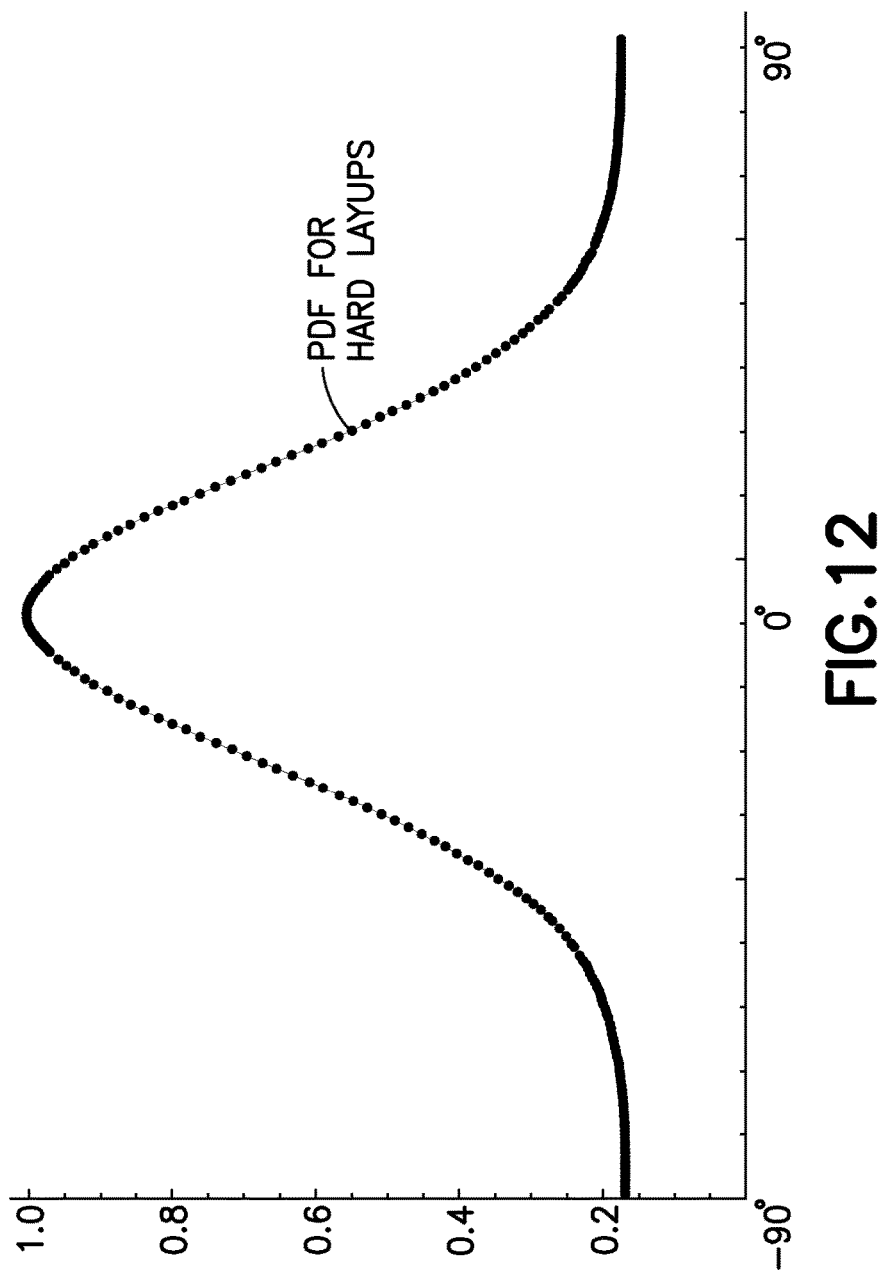
FIG. 12 is a graph showing a probability density function for hard layups as a function of ply angle θ.

As part of step 102, a probability density function for hard layups is selected or created. FIG. 12 is a graph showing a probability density function (PDF) for hard layups as a function of ply angle θ. The PDF is what forces the randomly generated layups to have a certain hardness. Therefore a designer typically creates and then stores a respective PDF for each hardness. In step 102, the designer selects the PDF that will produce the desired hardness. In cases where a quasi-isotropic layup is desired, a different PDF (having weights relatively close to 1.0 over a much wider range of ply angles than the range seen in FIG. 12) can be used.

Referring again to FIG. 11A, in the next step 104, a stringer layup type is selected. The selected stringer layup type may be either a non-traditional laminate, in which the ply angles vary between −90° and 90°, or a shuffled traditional laminate, in which the ply angles are restricted to 0°, ±45° and 90°. However, if appropriate, the design concept disclosed herein is applicable to steered-fiber plies as follows. From a strain field perspective, the ply may be approximated as a collection of different sections where the fiber orientation angle varies from section to section, but is constant within each section. The analysis may be performed for each section separately.

A suitably programmed computer is then used to generate a multiplicity of random layups using the selected probability density function (step 106). Angles are biased toward 0° with the goal of producing delamination-suppressing asymmetry. In addition, the plies of a traditional laminate are shuffled to create asymmetry.

The procedure of generating a layup is by randomly selecting the ply directions for each ply. However, if there is an equal probability of selecting any angle, then the resulting layup will be quasi-isotropic as it will have the plies uniformly distributed in all directions. To avoid this situation, a designer can bias selection of the ply directions in such a way that there is a higher probability of selecting 0° plies rather than other directions. A PDF shows the probability of selecting the plies of certain directions. Thus, when there is a "bump" in the PDF plot (as seen in FIG. 12), it is more likely that 0° plies (or close to 0° plies) will be selected rather than plies having other fiber directions. When there are more 0° plies, then a "harder" layup can be produced.

A PDF of the type shown in FIG. 12 enables a designer to produce randomly generated layups that have hardnesses that match the desired hardness. The PDF applies a spectrum of weights (i.e., bias factors) to the ply angles within a range. For 0° fibers, the weighting factor (or "bias factor" or relative probability) is 1.0. For ±90° fibers, the weighting factor is about 0.2. The weighting factor is larger for the 0° fibers. This means that, when layups are randomly generated, there will be more likelihood of the presence of a 0° (or near 0°) fiber direction in the resulting layup generated. The same logic applies to any fiber direction in between 0° and 90°. As a result, the "spectrum of weights" drives the hardnesses of the layups generated to be close to the desired hardness.

If a balanced stringer is desired, the randomly generated candidate layups are then screened (step 108), keeping only those layups which are balanced (i.e., the $A_{16}$ stiffness term is approximately equal to zero). The same computer (or a different computer) is programmed to perform the following analysis steps.

For each resulting layup, the Mode I, II and III components of the energy release rate for delamination between the stringer and skin are calculated (step 110 in FIG. 11A). The energy release rate is the energy dissipated during fracture per unit of newly created fracture surface area. The energy release rates $G_I$, $G_{II}$, and $G_{III}$, which correspond to fracture Modes I, II, and III, respectively, can be calculated using the Davidson Singular Field Approach or a suitable alternative theory. The details concerning calculation of an energy release rate using the Davidson Singular Field Approach are disclosed by Davidson et al. in an article entitled "An Analytical Crack-Tip Element for Layered Elastic Structures," ASME Journal of Applied Mechanics, Vol. 62, June (1995), pp. 294-305.

After the energy release rates $G_I$, $G_{II}$, and $G_{III}$ have been calculated, a failure criterion K is calculated (step 112), where:

$$K = \frac{1}{\sqrt{\frac{G_I}{G_{Ic}} + \frac{G_{II}}{G_{IIc}} + \frac{G_{III}}{G_{IIIc}}}}$$

The failure criterion K is a fracture performance indicator akin to the margin of safety MS (i.e., MS=K−1). The failure criterion states that a crack will initiate and grow when the value of the failure criterion K is below a critical value, which is 1.0. The quantities $G_{Ic}$, $G_{IIc}$, and $G_{IIIc}$ are the interlaminar fracture toughnesses for fracture Modes I, II, and III, respectively, and are considered to be material properties which are independent of the applied loads and the geometry of the body.

In the next step 114 in FIG. 11A, the candidate layups are screened for the highest values of the failure criterion.

Referring now to FIG. 11B (which is a continuation of FIG. 11A), those layups which do not belong to the batch with the highest values of the failure criterion are filtered out (step 116), i.e., removed from further consideration. The remaining candidate layups (having the highest failure criterion values) are then screened for the highest values of axial stiffness and bending rigidity (step 118). Those layups which do not belong to the batch with the highest values of axial stiffness and bending rigidity are filtered out (step 120), i.e., removed from further consideration.

Figure 13:
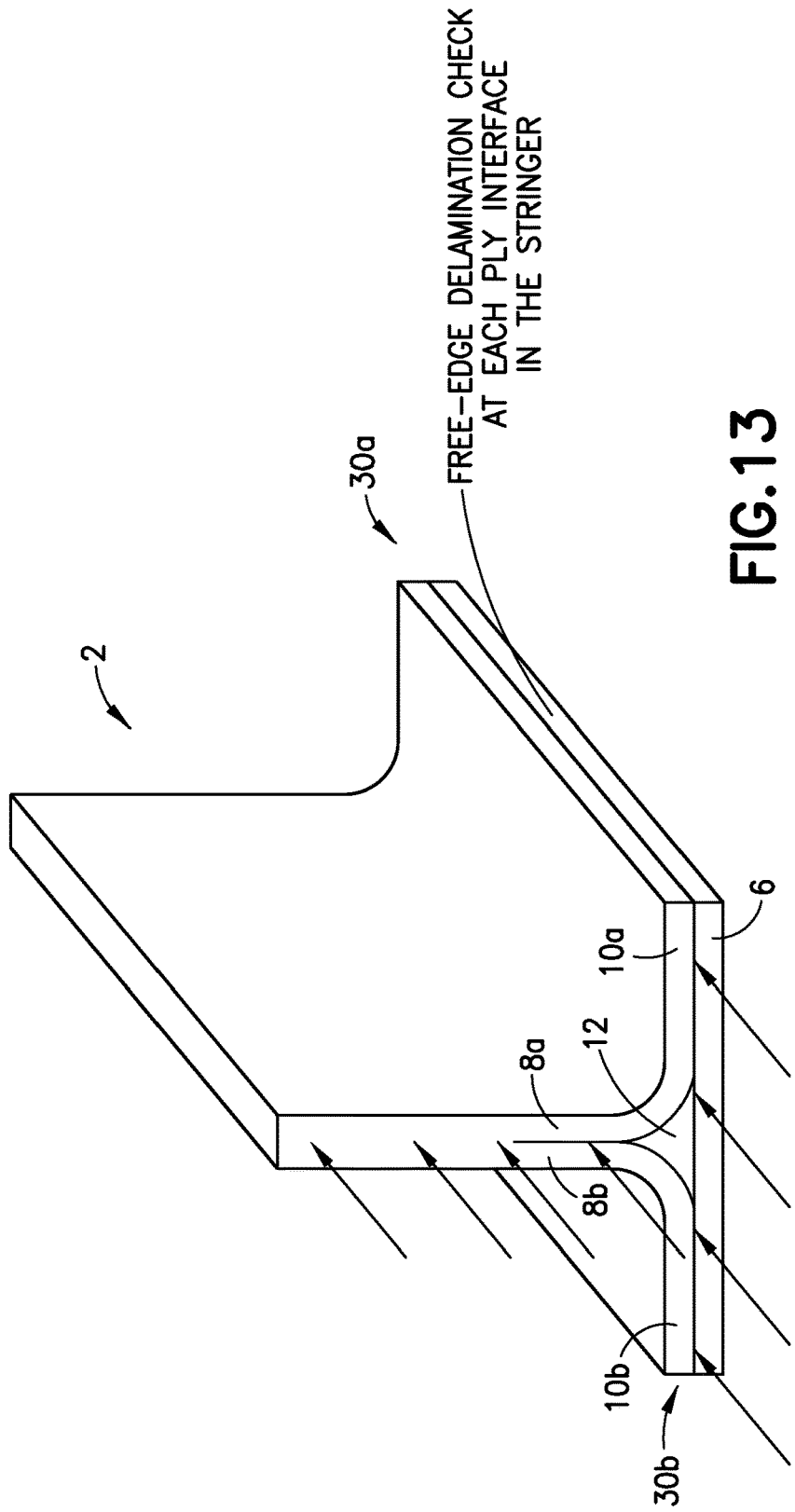
FIG. 13 is a diagram representing an isometric view of a composite blade stringer bonded to a composite skin panel. The arrows indicate compressive loading tending to cause free-edge delamination.

Composite laminates with unreinforced edges may fail by free edge delamination. FIG. 13 is a diagram representing an isometric view of a composite blade stringer 2. The blade stringer 2 comprises a formed sheet of generally elongated, adjacent, parallel blades 8a and 8b, a pair of flanges 10a and 10b which extend outwardly from the respective blades 8a and 8b at respective blade/flange junctions, and a base charge 6. The flanges 10a and 10b are bonded to the base charge 6 and to each other, forming a pair of free edges 30a and 30b. A channel bounded by the blade/flange junctions and the base charge 6 is filled with a noodle 12 made of composite material. In the example depicted in FIG. 13, the arrows indicate compressive loading tending to cause free-edge delamination.

The onset and growth of free edge delaminations may be predicted by a comparison of the respective failure criterion K value to its critical value (1.0). In the next step 122 (see FIG. 11B), the remaining candidate layups are checked for free edge delamination at each ply interface by calculating the energy release rates $G_I$, $G_{II}$ and $G_{III}$ for free edge delamination. The energy release rates $G_I$, $G_{II}$ and $G_{III}$ for free edge delamination can be calculated using the Davidson Free Edge Delamination Approach or a suitable alternative theory. The Davidson Free Edge Delamination Approach is disclosed by Davidson in an article entitled "Energy Release Rate Determination for Edge Delamination Under Combined In-Plane, Bending and Hygrothermal Loading. Part I—Delamination at a Single Interface," Journal of Composite Materials, Vol. 28, No. 11 (1994), pp. 1009-1031.

The analysis of the delamination between the stringer and skin in step 110 is a separate analysis from the free edge delamination analysis performed in step 122. Therefore the technique for calculating the energy release rates $G_I$, $G_{II}$ and $G_{III}$ is different in each analysis. For example, in step 110 the computer calculates the energy release rates for an upper layup represented by a stringer and a lower layup represented by a skin. In contrast, in step 122, the computer performs many such calculations. For example, the computer can first calculate the energy release rates for an upper layup represented by a single top ply of a stringer and a lower layup represented by all plies except the top ply of the stringer; then calculate the energy release rates for an upper layup represented by two topmost plies of the stringer and a lower layup represented by all plies except the two topmost plies of the stringer; and so forth.

In the case of a skin-stringer structure that forms part of a wing of an aircraft, the closing of the crack, or the reduction of susceptibility to delamination, between the stringer and skin pertains to delamination between the stringer and skin under the action of a load applied in the chordwise direction of the wing. In contrast, the free edge delamination analysis pertains to delamination between plies within the stringer under the action of a load applied in the spanwise direction of the wing.

Referring again to FIG. 11B, those candidate layups for which free edge delamination is predicted to occur at a ply interface are filtered out (step 124), i.e., removed from further consideration.

Then additional analyses are performed to further screen the surviving candidate layups (step 126), including but not limited to one or more of the following analyses: notched strength, sublaminate stability, thermal residual stresses, and interpenetration.

In step 128, a determination is made whether the analyses of step 126 indicate that one or more of the surviving candidate stringer layups are acceptable or not. If any of the candidate layups are acceptable, then the analysis process is terminated. The accepted candidate layups can be stored in computer memory to form a library of stringer designs. Subsequently, stringers can be manufactured using any one of these stringer designs retrieved from the library.

If a determination is made in step 128 that none of candidate stringer layups are acceptable, then the designer can make adjustments to the design process by returning to a previous step and adjusting the filtering parameters. More specifically, the "OR" statement in FIG. 11B means that the design process can go back to either filter 116 or filter 120. The designer can choose which branch to take after the "OR" statement in FIG. 11B. Either of the specified choices will be valid and does not change the approach.

In some cases, the designer can choose to change the filtering parameters of filter 116 such that a new batch of candidate layups with less optimal (i.e., lower) values of the failure criterion are passed through for further analysis. In other words, step 114 is effectively changed so that those candidate layups originally produced by step 112 which have less optimal values, not the highest values, of the failure criterion will be screened. This means that filter 116 will filter out the candidate layups having the highest and lowest values, passing those with less optimal values of the failure criterion.

In other cases, the designer can choose to change the filtering parameters of filter 120 such that a new batch of candidate layups with less optimal (i.e., lower) values of the axial stiffness and bending rigidity are passed through for further analysis. In other words, step 118 is effectively changed so that those candidate layups originally passed through filter 116 which have less optimal values, not the highest values, of the axial stiffness and bending rigidity will be screened. This means that filter 120 will filter out the candidate layups having the highest and lowest values, passing those with less optimal values of the axial stiffness and bending rigidity.

In either case, steps 122, 124, 126 and 128 are repeated for this new batch of candidate layups. The foregoing process can be repeated until a determination is made in step 128 that one or more candidate layups are acceptable, at which point the design process is terminated as previously described.

FIG. 14 shows steps of a process for designing composite skin-stringer structures that employs optimization and finite element analysis. The design process begins with a definition of the problem (process 70). The problem definition process 70 includes the following steps: selection of the desired layup type (i.e., traditional laminate, non-traditional laminate or steered fiber) and thickness of the skin (step 72); selection of an initial skin-stringer configuration for given skin, loading, flaw/crack location, boundary conditions, and stringer ply angles (step 74); selection of appropriate design constraints (e.g., minimum/maximum axial stringer stiffness, layup symmetry and balance) (step 76); and selection of the desired layup type (i.e., traditional laminate, non-traditional laminate or steered fiber) and thickness (i.e., fixed or adjustable) of the stringer (step 78).

After problem definition, the stringer design is optimized to satisfy the criterion that delamination of the stringer from the skin be suppressed (step 80) and other constraints. After the designer has selected the candidate stringer ply angles (for example, equal amounts of 0°/45°/90° plies), the optimization algorithm refines the guess. The proposed process can utilize either local or global optimization or both. Any optimization method can be applied here. During optimization of the candidate stringer layup, the ply angles and thicknesses in the stringer layup are adjusted to satisfy the design criteria and improve the failure criterion.

After the optimization algorithm has produced an optimal stringer layup design, the designer can manually adjust the ply angles and thicknesses to meet manufacturing requirements (discrete thickness, etc.) not present in the optimization process (step 82).

Next the optimized and adjusted stringer layup design is checked for free edge delamination between each ply interface by calculating the energy release rates for free edge delamination (step 84). The energy release rates for free edge delamination can be calculated using the Davidson Free Edge Delamination Approach or a suitable alternative theory, as previously described.

Following the free edge delamination check, the delamination susceptibility of the skin-stringer layup is verified using the virtual crack closure technique (step 86). A detailed description of the virtual crack closure technique has been presented by Krueger in an article entitled "Virtual crack closure technique: History, approach, and applications," Appl. Mech. Rev., Vol. 57, No. 2, March (2004), pp. 109-143. The virtual crack closure technique is used to compute the strain energy release rate based on results obtained from finite element analysis of the skin-stringer structure. The method is based on the assumption that the energy released when a crack at the skin-stringer interface is extended by an incremental distance is identical to the energy required to close the crack between the endpoints of that incremental distance.

Referring again to FIG. 14, if the finite element analysis verifies that skin-stringer delamination will be suppressed by the candidate stringer layup design, then further analyses are performed, such as notched strength, sublaminate stability, thermal residual stresses, and interpenetration. Based on the results of these analyses, a determination is made whether the candidate stringer layup design is acceptable (step 88).

If the candidate stringer layup is acceptable, then the analysis process is terminated. Subsequently, stringers can be manufactured using this accepted stringer layup design. In contrast, if a determination is made in step 88 that the candidate stringer layup is not acceptable, then the designer can make adjustments to the optimization problem to account for violated constraints, such as variable bounds and extra restrictions (step 90). Then the design process returns to step 80. The optimization is iteratively performed until an acceptable stringer layup design is realized.

Figure 15:
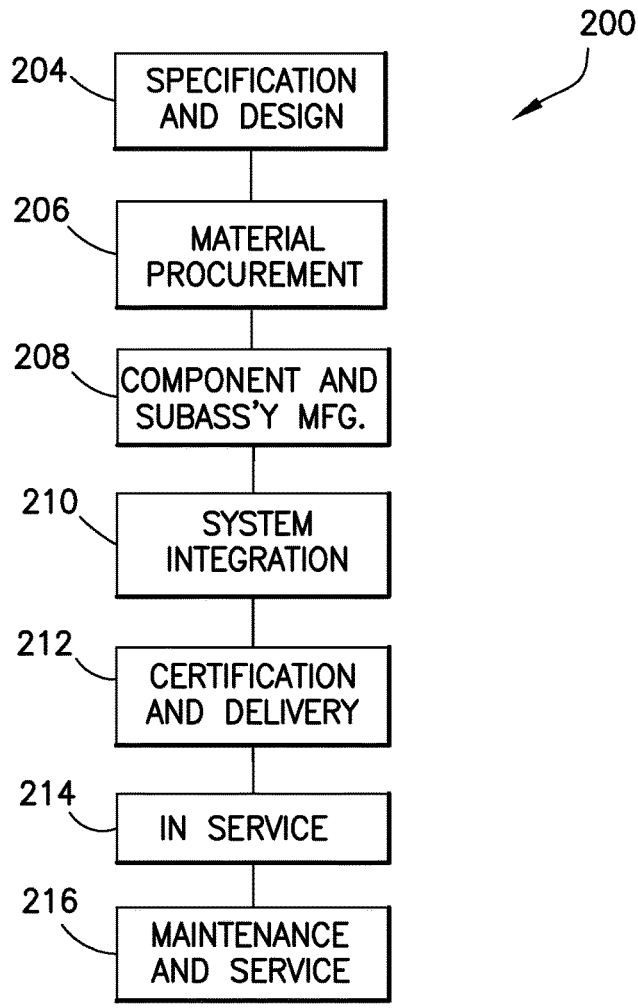
FIG. 15 is a flow diagram of an aircraft production and service methodology.
Figure 16:
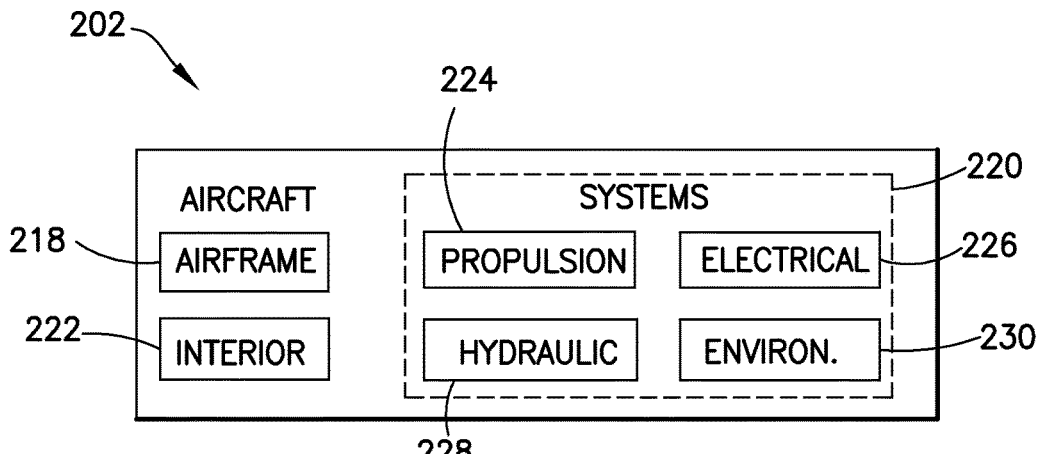
FIG. 16 is a block diagram showing systems of an aircraft.

The skin-stringer design and methods of designing skin-stringer structures disclosed above may be employed in an aircraft manufacturing and service method 200 as shown in FIG. 15 for fabricating parts of an aircraft 202 as shown in FIG. 16. During pre-production, exemplary method 200 may include specification and design 204 of the aircraft 202 (including, for example, the design of stringers for incorporation in wings and fuselages made of composite material) and material procurement 206. During production, component and subassembly manufacturing 208 and system integration 210 of the aircraft 202 takes place. Thereafter, the aircraft 202 may go through certification and delivery 212 in order to be placed in service 214. While in service by a customer, the aircraft 202 is scheduled for routine maintenance and service 216 (which may also include modification, reconfiguration, refurbishment, and so on).

Each of the processes of method 200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 16, the aircraft 202 produced by exemplary method 200 may include an airframe 218 (comprising, e.g., a fuselage, frames, stringers, wing boxes, etc.) with a plurality of systems 220 and an interior 222. Examples of high-level systems 220 include one or more of the following: a propulsion system 224, an electrical system 226, a hydraulic system 228, and an environmental control system 230. Any number of other systems may be included. Although an aerospace example is shown, the principles disclosed herein may be applied to other industries, such as the automotive industry.

Apparatus and methods embodied herein may be employed during one or more of the stages of exemplary method 200 shown in FIG. 15. For example, during pre-production, method 200 may include specification and design 204 of skin-stringer structures using the design methodology disclosed above. In addition, skin-stringer structures having the advantageous properties disclosed above may be fabricated during the process of component and subassembly manufacturing 208. Also, one or more apparatus embodiments, method embodiments, or a combination thereof may be utilized during the production stages 208 and 210, for example, by substantially expediting assembly of or reducing the cost of an aircraft 202.

While composite skin-stringer structures and methods for their design have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

As used in the claims, the term "computer system" should be construed broadly to encompass a system having at least one computer or processor, and which may have multiple computers or processors that communicate through a network or bus. As used in the preceding sentence, the terms "computer" and "processor" both refer to devices having a processing unit (e.g., a central processing unit) and some form of memory (i.e., computer-readable medium) for storing a program which is readable by the processing unit.

In addition, the method claims set forth hereinafter should not be construed to require that the steps recited therein be performed in alphabetical order (any alphabetical ordering in the claims is used solely for the purpose of referencing previously recited steps) or in the order in which they are recited. Nor should they be construed to exclude any portions of two or more steps being performed concurrently or alternatingly.

The invention claimed is:

1. A composite structure comprising:
   a composite skin comprising a first composite laminate; and
   a composite stringer having at least one flange bonded to a portion of said composite skin, said at least one flange comprising a second composite laminate, said second composite laminate comprising a stack of plies of composite material having a free edge, said plies of said stack comprising fibers oriented at respective ply angles or fibers steered at varying angles within a ply, said fibers being arranged to cause coupling of first and second deformation modes in a manner that suppresses a tendency toward delamination at an interface of a first ply of said stack and said portion of said composite skin while said portion of said composite skin is being loaded in a direction perpendicular to said free edge of said at least one flange, wherein said second composite laminate of said at least one flange is unsymmetric, and wherein the angles of the fibers in the plies of the second composite laminate are determined by a method comprising: defining characteristics of the first composite laminate; defining desired characteristics of the second composite laminate; defining predicted loading and delamination location; selecting a probabilistic or optimization strategy; adjusting ply angles of a candidate layup of the second composite laminate toward satisfying the desired characteristics using the selected strategy; and verifying that the candidate layup satisfies the desired characteristics, wherein the desired characteristics include suppression of delamination at the interface of the first and second composite laminates in the vicinity of the free edge of the second composite laminate.

2. The composite structure as recited in claim 1, wherein said first deformation mode is an axial deformation mode and said second deformation mode is a bending deformation mode.

3. The composite structure as recited in claim 1, wherein said unsymmetric second composite laminate produces bending curvature in response to tensile or compressive loading.

4. The composite structure as recited in claim 1, wherein at least one ply of said plies of said stack has a ply angle which is not equal to any one of the following ply angles: 0, ±45 and ±90 degrees.

5. The composite structure as recited in claim 1, wherein adjacent plies of said stack are adjoined at respective ply interfaces, and each ply interface of said stack has a failure criterion value which is a combination of Mode I, II and III energy release rates and which is less than a critical failure criterion value associated with a start of free edge delamination.

6. A composite structure comprising a composite laminate stringer comprising a first stack of plies having a free edge and a composite laminate skin comprising a second stack of plies, said composite laminate stringer and skin being bonded at an interface adjacent to said free edge, wherein said plies of said first stack comprise fibers oriented at respective ply angles or fibers steered at varying angles within a ply, said fibers being arranged to cause coupling of first and second deformation modes in a manner that suppresses a tendency toward delamination at said interface when said composite laminate skin is loaded in a direction perpendicular to said free edge, wherein said composite laminate stringer is unsymmetric, and wherein the angles of the fibers in the plies of the composite laminate stringer are determined by a method comprising: defining characteristics of the composite laminate skin; defining desired characteristics of the composite laminate stringer; defining predicted loading and delamination location; selecting a probabilistic or optimization strategy; adjusting ply angles of a candidate layup of the composite laminate stringer toward satisfying the desired characteristics using the selected strategy; and verifying that the candidate layup satisfies the desired characteristics, wherein the desired characteristics include suppression of delamination at the interface of the composite laminate stringer and skin in the vicinity of the free edge of the composite laminate stringer.

7. The composite structure as recited in claim 6, wherein said first deformation mode is an axial deformation mode and said second deformation mode is a bending deformation mode.

8. The composite structure as recited in claim 6, wherein said unsymmetric composite laminate stringer produces bending curvature in response to tensile or compressive loading.

9. The composite structure as recited in claim 6, wherein at least one ply of said plies of said first stack has a ply angle which is not equal to any one of the following ply angles: 0, ±45 and ±90 degrees.

10. The composite structure as recited in claim 6, wherein adjacent plies of said first stack are adjoined at respective ply interfaces, and each ply interface of said first stack has a failure criterion value which is a combination of Mode I, II and III energy release rates and which is less than a critical failure criterion value associated with a start of free edge delamination.

* * * * *